UNITED STATES PATENT OFFICE.

JOHN COPE BUTTERFIELD, OF BALHAM, LONDON, ENGLAND, ASSIGNOR OF ONE-HALF TO ARTHUR ASHWORTH, OF BURY, ENGLAND.

PRODUCTION OF TUNGSTEN FROM SCHEELITE.

1,217,913.  Specification of Letters Patent.  Patented Mar. 6, 1917.

No Drawing.  Application filed December 8, 1915.  Serial No. 65,672.

*To all whom it may concern:*

Be it known that I, JOHN COPE BUTTERFIELD, subject of the King of Great Britain and Ireland, residing at 79 Endlesham road, Balham, London, S. W., England, have invented certain new and useful Improvements in or Relating to the Production of Tungsten from Scheelite, of which the following is a specification.

This invention relates to the production of tungsten from scheelite, tungstate of calcium. Scheelite ores contain varying quantities of tungstic oxid and lime, pure scheelite (tungstate of calcium) containing up to about 83 per cent. of tungstic oxid and about 17 per cent. of lime. As is known, however, scheelite ores usually contain silica and may contain other matters, according to the source and character of the scheelite.

The present invention relates to processes of the kind in which the scheelite is reduced by heating in admixture with carbon or carbonaceous material, or, in presence of a reducing gas, to convert the tungsten into the metallic state, and the object of the invention is to provide a simple and economical process for the recovery of the metallic tungsten from the reduced mass.

According to the invention, after reducing the scheelite by heating, as before referred to, I separate the metallic tungsten from the resulting mixture by a process of mechanical separation, taking advantage of the difference between the specific gravity of the tungsten and that of the matters with which it is mixed. This may be effected by any suitable mechanical separating apparatus, but preferably by a wet shaking or percussive dressing table or concentrator.

By means of the said process of separation, it is possible, in a simple and economical manner, to separate the reduced metallic tungsten from the matters fixed therewith, which usually contain silicate of lime resulting from the heating at the high temperature required by the reduction, and which is difficultly soluble in either hydrochloric or nitric acid.

The metallic tungsten thus separated may be treated with dilute hydrochloric acid to remove any traces of free lime still adhering to it, and be then washed free from acid.

Thus with the aid of the invention, tungsten of high purity can be obtained simply and cheaply.

For reducing the scheelite, any known or suitable procedure may be adopted, such, for example, as the following:

The scheelite, in which term I include both the ore and the artificially produced body, is taken and crushed to fine powder so as to pass a 90 mesh sieve and is then mixed with about 12 to 13 per cent. of its weight of charcoal in an edge runner mill, together with a sufficiency of water to make the whole damp. The mixture is then passed into a briqueting press where it is compressed into small briquets, which are afterward dried on a steam plate or by waste heat.

The dry briquets are then placed in a crucible, say of graphite or black lead, provided with a lid in which a hole is bored for the exit of the gases arising from the reduction of the tungstic oxid, and the lids are fixed on by means of fireclay. The crucibles are then placed in the furnace, which is heated by coke, oil or gas, and the temperature is gradually raised to a white heat, say about 1100° or 1200° C., and the crucibles are kept thus heated for 4 or 5 hours to effect the reduction of the tungstic oxid. The crucibles are then removed from the furnace and allowed to cool, care being taken to prevent access of atmospheric oxygen to their contents during cooling. When cold, the crucibles are removed and the contents are emptied out.

In carrying out the invention, the reduced mass should first be sifted through a 30 or 40 mesh sieve, any "oversize" being crushed by a crushing mill until the whole passes the sieve, and the mixture is then fed on to a shaking or percussible dressing table, such for example as the "Record" or Wilfley table, which by its action and under the influence of the water with which the table is fed, will separate the heavy metallic tungsten from the other matter by gravity, the heavy metallic particles being delivered into the boxes provided for concentrates, and the other matter passing away as waste.

When the metallic tungsten has been thus concentrated it may be treated with dilute hydrochloric acid to remove any lime still adhering to it, and after washing it free from acid it is ready for the steel maker.

What I claim and desire to secure by Letters Patent is:—

1. A reduction process for the production of tungsten from scheelite, comprising reducing the scheelite and separating the metallic tungsten from the reduced mass of scheelite by a process of mechanical gravity substantially as described.

2. A reduction process for the production of tungsten from scheelite, comprising reducing the scheelite and subjecting the reduction mixture to a process of mechanical separation by the combined action of a flow of water and gravity to separate the metallic tungsten, substantially as described.

3. A reduction process for the production of tungsten from scheelite, comprising reducing the scheelite and subjecting the reduction mixture to a process of mechanical separation by the combined action of a flow of water, vibration and gravity to separate the metallic tungsten therefrom, substantially as described.

4. A reduction process for the production of tungsten from scheelite, comprising reducing the scheelite and subjecting the reduction mixture to mechanical separation on a wet vibrating dressing table or concentrator, to separate the metallic tungsten, substantially as described.

5. A reduction process for the production of tungsten from scheelite, comprising reducing the scheelite, subjecting the reduction mixture to mechanical gravity separation to separate the metallic tungsten from the reduced mass of scheelite, treating the separated tungsten with dilute acid and washing the tungsten free from acid, substantially as described.

In witness whereof, I have hereunto signed my name in the presence of two subscribing witnesses.

JOHN COPE BUTTERFIELD.

Witnesses:
   THOMAS LAING WHITEHEAD,
   ROBERT MILTON SPEARPOINT.